United States Patent [19]

Watanabe

[11] Patent Number: 5,337,200
[45] Date of Patent: Aug. 9, 1994

[54] THIN FILM MAGNETIC HEAD ASSEMBLY AND METHOD OF OPERATION THEREOF IMMUNE FROM WIGGLES

[75] Inventor: Makoto Watanabe, Tokyo, Japan

[73] Assignee: NEC Corporation, Tokyo, Japan

[21] Appl. No.: 961,057

[22] Filed: Oct. 14, 1992

Related U.S. Application Data

[63] Continuation of Ser. No. 489,142, Mar. 5, 1990, abandoned.

[30] Foreign Application Priority Data

Mar. 3, 1989 [JP] Japan .................................. 1-52397

[51] Int. Cl.$^5$ .............................................. G11B 5/03
[52] U.S. Cl. ..................................................... 360/66
[58] Field of Search ..................... 360/66, 46, 67, 126

[56] References Cited

U.S. PATENT DOCUMENTS

| | | | |
|---|---|---|---|
| 4,530,016 | 7/1985 | Sawazaki | 360/55 |
| 4,680,657 | 7/1987 | Naito | 360/111 |
| 4,792,868 | 12/1988 | Ozaki | 360/46 |
| 5,041,922 | 8/1991 | Wood et al. | 360/66 |

OTHER PUBLICATIONS

IEEE Transactions on Magnetics, vol. Mag-21, No. 5, Sep., 1985, "Mechanism of 90° Wall Motion in Thin Film Heads" Keishi Ohashi pp. 1581-1583.

*Primary Examiner*—Donald Hajec
*Assistant Examiner*—Won Tae C. Kim
*Attorney, Agent, or Firm*—Sughrue, Mion, Zinn, Macpeak & Seas

[57] ABSTRACT

A thin film magnetic head assembly includes a thin film magnetic core and a conductive coil wound around the magnetic core. A constant direct bias current is applied to the conductive coil during a reading operation to reduce a noise caused by the "wiggles" phenomenon.

4 Claims, 1 Drawing Sheet

THIN FILM MAGNETIC HEAD ASSEMBLY AND METHOD OF OPERATION THEREOF IMMUNE FROM WIGGLES

This is a continuation of application Ser. No. 07/489,142 filed Mar. 5, 1990 now abandoned.

BACKGROUND OF THE INVENTION

The present invention relates to a thin film magnetic head which is used for writing and reading information to and from a magnetic recording medium.

A thin film magnetic head includes a thin film magnetic core around which is wound a conductive coil. Conventional thin film magnetic heads exhibit an operational defect, known as "wiggles" to those skilled in the art. This defect may become more pronounced after a write current, applied to the coil during a write operation, changes the core magnetization (i.e., the magnetic domain patterns of the magnetic core), when such change persists after termination of the write current. In accordance with the "wiggles" phenomenon, when a magnetic field is applied from a recorded magnetic medium to the magnetic core in a read operation, there is a disturbance of the read signal from the coil caused by noise generated with a change in the magnetic core magnetization.

To help prevent this defect, it is necessary to stabilize the magnetic core magnetization against the strong magnetic field applied to the magnetic core during a write operation, as is proposed by K. Ohashi in the document entitled "Mechanism of 90° Wall Motion in Thin Film Heads", IEEE Transactions on Magnetics, Vol. MAG-21, No. 5, pp, 1581–1583, September, 1985. To this end, the conventional thin film magnetic head is required to have a magnetic core whose contents (e.g., Ni, Fe, and so on) by weight percentages are strictly controlled to be within certain ranges, and whose axis of easy magnetization is at a right angle with respect to the applied magnetic field. As to the latter, i.e., the angle of the easy magnetization axis, to obtain the required angular relationship, strict control of the physical characteristic of almost all the magnetic head components is required. These components include the protective layer, the insulating layer, the conductive coil, etc. of the magnetic head. Conflicting with these requirements is the fact that the weight percentage control and the physical characteristic control have certain limits due to manufacturing limitations, so that the defect called "wiggles" is difficult to reduce.

SUMMARY OF THE INVENTION

Therefore, an object of the present invention is to provide a thin film magnetic head in which a read signal is not disturbed by "wiggles".

According to the present invention, wiggles are prevented by application of a constant direct current to the conductive coil of a thin film magnetic head, the magnitude of the direct current being sufficient to generate a magnetic field bias which stabilizes the core magnetization against wiggles. The magnetic field bias is selected to produce a linear magnetization response to an applied recorded magnetic field. The linear response occurs when magnetization results from rotational motion rather than wall movement.

A thin film magnetic head assembly according to the present invention comprises a thin film magnetic core and a conductive coil wound around the magnetic core in combination with a direct current source for applying a constant direct current to the conductive coil during a read operation.

DETAILED DESCRIPTION OF THE PREFERRED EMBODIMENT

Figure 1:
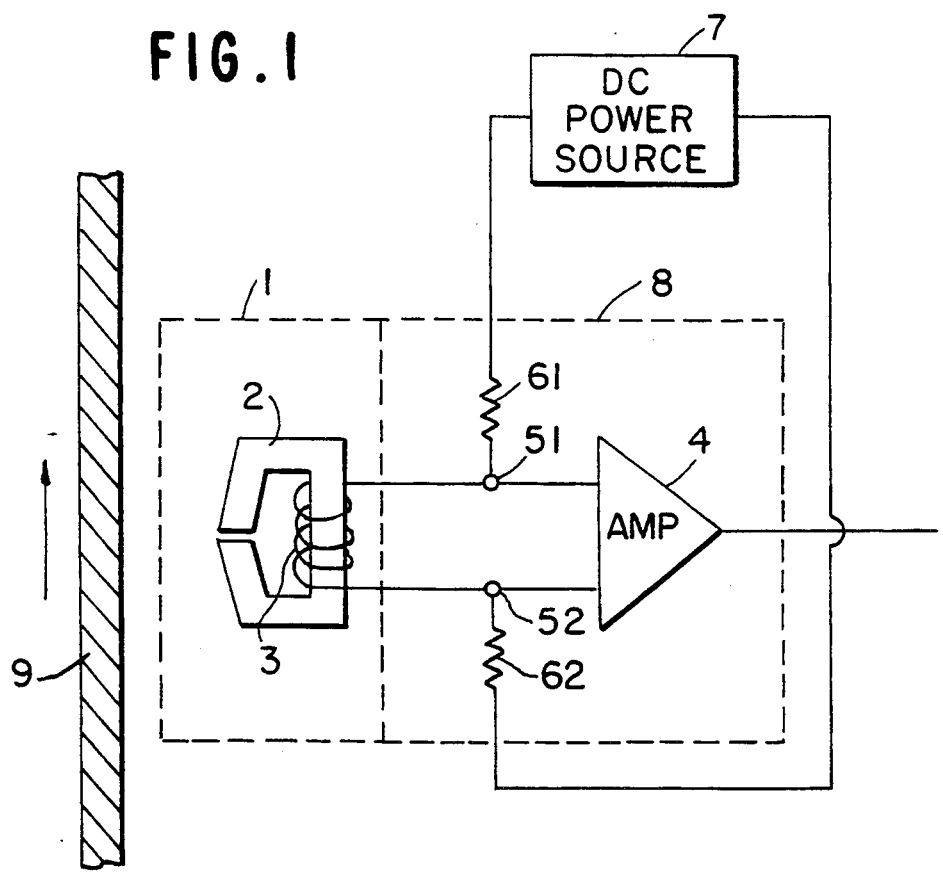
FIG. 1 is a block diagram schematically showing an embodiment of the present invention.

Referring to FIG. 1, a thin film magnetic head 1 includes a magnetic core 2 of magnetic thin film and a conductive coil 3 wound around the magnetic core 2. Both the magnetic core 2 and coil 3 are formed by thin film forming techniques well known in the art. For simplicity, the magnetic core 2 and coil 3 are schematically illustrated in FIG. 1. Terminal ends of the coil 3 are connected to an amplifier 4 via respective terminals 51 and 52. The terminals 51 and 52 are also connected to a DC (direct current) power source 7 via terminating resistors 61 and 62, respectively. The amplifier 4, terminals 51 and 52 and resistors 61 and 62 can be constructed as an integrated circuit 8.

During a write operation, the amplifier 4 may, for example, supply a write current of about 40 mA to the coil 3 causing the core 2 to generate a magnetic field of about 2,500 Oe at its gap, for writing information to a magnetic medium 9, which has, for example, a coercive force of 1,000 Oe. This write current has a tendency to change the magnetic domain patterns of the magnetic core, which change can persist after termination of the write current and magnify the wiggles phenomenon.

The inventor of the invention described herein believes that application of the relatively small recorded magnetic field from a magnetic recording medium during a read operation produces magnetization in the core mainly by wall motion. Wall motion magnetization is non-linear, which non-linearity is believed to produce the noise in the read current known as wiggles.

Thus, according to the present invention, and in connection with the foregoing embodiment, during a read operation, the DC power source 7 supplies a constant DC bias current of about 1.2 mA to the coil 3. This bias current causes the core 2 to generate a bias magnetic field of about 0.5 Oe within the core 2 and about 100 Oe at the gap of the core 2. At the same time, the core 2 senses the recorded magnetic field from the recording medium 9 causing the coil 3 to generate a read signal. The read signal is amplified by the amplifier 4 and sent to a conventional reading circuit (not shown).

The aforementioned bias magnetic field generated during the read operation stabilizes the magnetization of core 2. That is, the bias magnetic field magnetizes the core 2 to cause a predetermined amount of magnetic wall movement in the core 2. As a consequence of this wall movement, the recorded magnetic field from the medium 9 generates a magnetic flux in the core 2 caused mainly by a rotational motion of magnetization, which is linear in response to the recorded magnetic flux.

Figure 2:
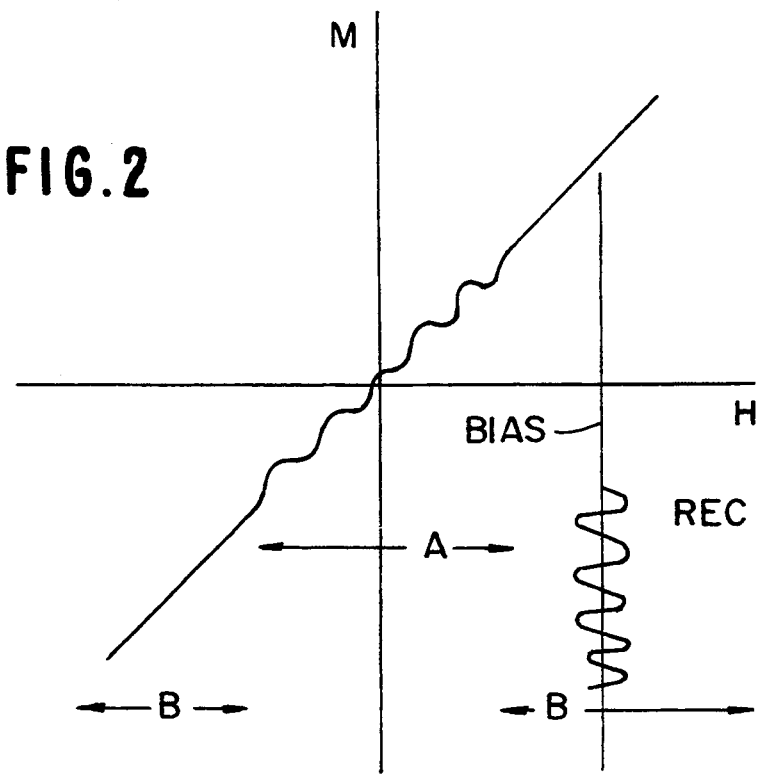
FIG. 2 is a graph showing the operation of the present invention.

More specifically and referring to FIG. 2, the magnetization M of the core 2 is non-linear in response to a relatively small (range A), externally applied magnetic field H. The non-linearity results from the fact that such magnetization of the core 2 is carried out mainly by magnetic wall movement. The magnetization M becomes linear when the magnetic field H is large (in range B) because, when the magnetic field strength is large, the magnetization of the core 2 is carried out mainly by the rotational motion of magnetization which presents a linear relationship with the applied magnetic field. Therefore, according to this invention, reproduction of the recorded magnetic field, REC, is carried out in the range B by applying a bias magnetic field, BIAS, to the core 2 of a strength sufficient to place the recorded magnetic field in the linear range.

While the value of the bias magnetic field must be large enough to enable the magnetization of the core 2 to be carried out by the rotational motion of magnetization, it must be small enough not to destroy the information recorded on the magnetic medium 9. The inventor of the present invention found that the bias magnetic field at the gap of the core 2 is preferably less than 20% (200 Oe) of the coercive force (1,000 Oe ) of the magnetic medium 9. However, the bias magnetic field should be as large as possible within the above range. Although the value of the bias magnetic field depends on the configuration of the magnetic core 2, the turn number of the coil 3, and so on, the appropriate value of the bias current can be determined such that the bias magnetic field for a specific thin film magnetic head for use with a specified magnetic recording medium is sufficient to bias the recorded magnetic field, REC, into the aforementioned linear region. For the embodiment described herein, to obtain the maximum bias magnetic field of 200 Oe at the gap of the core 2, the bias current is determined at 2.4 mA.

As described above, the thin film magnetic head assembly and method for eliminating "wiggles" according to the present invention permits reading of recorded information from a recording medium with high accuracy.

What is claimed is:

1. A thin film induction type magnetic head assembly comprising:

a thin film magnetic core having a gap;

a conductive coil would around said magnetic core and having a pair of terminal ends;

detecting means connected to said terminal ends for detecting, as a read signal, voltage induced in said conductive coil by change of a direction of magnetic field at said gap; and means for applying a constant current to said terminals of said conductive coil during a read operation to produce a bias magnetic field at said gap and for maintaining the bias magnetic field at less than 20% of a coercive force of a magnetic medium from which a recorded magnetic field is to be read and so that magnetization of said thin film magnetic core is carried out mainly by rotational motion of magnetization.

2. A method for preventing a wiggles phenomenon in a thin film induction type magnetic head comprising a thin film magnetic core having a gap and a conductive coil wound around said magnetic core, said method comprising the steps of:

producing a bias magnetic field in said thin film magnetic core during a read operation, controlling a magnitude of said bias magnetic field to magnetize said thin film magnetic core into its linear magnetization region and for maintaining said bias magnetic field at less than 20% of a coercive force of a magnetic medium from which a recorded magnetic field is to be read and so that magnetization of said thin film magnetic core is carried out mainly by rotational motion of magnetization; and detecting a voltage induced in said conductive coil by change of a direction of magnetic field at said gap as a read signal.

3. A method for preventing a wiggles phenomenon as claimed in claim 2, wherein said step of producing a bias magnetic field includes the step of applying a constant current to said conductive coil during a read operation, and said step of controlling the magnitude of said bias magnetic field includes the step of controlling the magnitude of said constant current to produce a bias magnetic field of a magnitude which magnetizes said thin film magnetic core into its linear magnetization region.

4. A method for preventing a wiggles phenomenon as claimed in claim 3 further including the step of limiting the magnitude of said bias magnetic field below a level which would destroy information recorded on a magnetic recording medium to be read by said head during a read operation.

* * * * *